United States Patent
Nelles et al.

(10) Patent No.: US 8,293,866 B2
(45) Date of Patent: Oct. 23, 2012

(54) METHOD OF PRODUCING A POLY (ETHYLENE OXIDE) COPOLYMERISED WITH AT LEAST ONE OTHER ALKYLENE OXIDE

(75) Inventors: Gabriele Nelles, Stuttgart (DE); Silvia Rosselli, Mannheim (DE); Tzenka Miteva, Stuttgart (DE); Akio Yasuda, Suginami-ku (JP); Christo Tsvetanov, Sofia (BG); Rayna Stamenova, Sofia (BG); Iliyana Berlinova, Sofia (BG); Petar Petrov, Sofia (BG)

(73) Assignee: Sony Deutschland GmbH, Berlin (DE)

( * ) Notice: Subject to any disclaimer, the term of this patent is extended or adjusted under 35 U.S.C. 154(b) by 663 days.

(21) Appl. No.: 12/295,307

(22) PCT Filed: Mar. 27, 2007

(86) PCT No.: PCT/EP2007/002710
§ 371 (c)(1),
(2), (4) Date: Oct. 30, 2009

(87) PCT Pub. No.: WO2007/112888
PCT Pub. Date: Oct. 11, 2007

(65) Prior Publication Data
US 2010/0056753 A1     Mar. 4, 2010

(30) Foreign Application Priority Data

Mar. 31, 2006    (EP) ...................................... 06006900

(51) Int. Cl.
*C08G 65/04*      (2006.01)
(52) U.S. Cl. ........ 528/419; 528/425; 564/505; 568/620; 568/623; 568/624; 568/679
(58) Field of Classification Search .................. 528/425; 564/505; 568/620, 623, 624, 679
See application file for complete search history.

(56) References Cited

U.S. PATENT DOCUMENTS

| 4,195,167 A | 3/1980 | Knopf et al. |
| 6,878,491 B1 | 4/2005 | Miura et al. |
| 2005/0197485 A1 | 9/2005 | Saeki et al. |

FOREIGN PATENT DOCUMENTS

| EP | 0 994 143 | 4/2000 |
| EP | 1 568 726 | 8/2005 |

*Primary Examiner* — Shane Fang
(74) *Attorney, Agent, or Firm* — Oblon, Spivak, McClelland, Maier & Neustadt, L.L.P.

(57) ABSTRACT

The present invention relates to a method of producing a poly(ethylene oxide) copolymerized with one alkylene oxide and to a poly(ethylene oxide-co-alkylene oxide) copolymer produced by such method, a photovoltaic device containing such poly(ethylene oxide-co-alkylene oxide)-copolymer, and to uses of such poly(ethylene oxide)-(alkylene oxide)-copolymer.

14 Claims, No Drawings

METHOD OF PRODUCING A POLY (ETHYLENE OXIDE) COPOLYMERISED WITH AT LEAST ONE OTHER ALKYLENE OXIDE

The present invention relates to a method of producing a poly(ethylene oxide) copolymerized with one alkylene oxide and to a poly(ethylene oxide-co-alkylene oxide) copolymer produced by such method, a photovoltaic device containing such poly(ethylene oxide-co-alkylene oxide)-copolymer, and to uses of such poly(ethylene oxide)-(alkylene oxide)-copolymer.

High molecular weight poly(ethylene oxide) is a crystalline polymer, which is commonly obtained by suspension polymerization of ethylene oxide in an inert solvent by calcium or zinc catalysts. The crystallinity of poly(ethylene oxide) is disadvantageous for its applications, for instance, in the preparation of polymer electrolytes used in lithium batteries, solar cells and others. Continuos efforts have been made to reduce the crystallinity of poly(ethylene oxide) either by adding a plasticiser or by copolymerising ethylene oxide with other alkylene oxides. Both the plasticiser, usually a low molecular weight polyether, or a polar organic solvent and the comonomer introduce disorder in the crystalline phase and thus decrease the crystallinity of the material obtained.

A copolymerization of ethylene oxide with other alkylene oxides, initiated by calcium based catalysts in an inert diluent, resulted in lower crystalline polymers compared to the pure poly(ethylene oxide) with molecular weight in the range of $10^5$-$10^6$ (See J. Kant et al. Electro-chimica Acta 48 (2003) 2487_2491, and A. F. Nogueira et all Coordination Chemistry Reviews 248 (2004) 1455_1468)

Although the copolymerization of ethylene oxide with other alkylene oxides results in products having a lower crystallinity, the so far reported synthetic strategy has some negative aspects, e.g. poor control over the incorporation of the copolymer units along the backbone. In practice, it is difficult to control the regular arrangement of the comonomer block throughout the poly (ethylene oxide) chain since the reactivity of ethylene oxide monomers is much higher than that of the other alkylene oxide monomer. Accordingly, the object of the present invention was to devise a method for producing poly(ethylene oxide-co-alkylene oxide) copolymers wherein the alkylene oxide monomer building blocks are incorporated along the chain in a controlled manner. It was also an object of the present invention to provide for a method of producing poly(ethylene oxide-co-alkylene oxide) copolymers having a defined structure, e.g. a multiblock tapered structure.

It was also an object of the present invention to provide for poly(ethylene oxide) copolymers having a low degree of crystallinity (or crystallinity) and thus being suitable for use in various applications, such as polymer electrolytes in batteries, photovoltaic devices etc.

All these objects are solved by a polymerization procedure in which ethylene oxide is copolymerized with at least one other alkylene oxide, comprising the steps:

a) providing a reaction mixture comprising ethylene oxide and at least one other alkylene oxide,
b) allowing said reaction mixture to undergo a polymerization reaction,
c) adding a defined amount of further ethylene oxide to said reaction mixture at least once whilst said polymerization reaction is in progress.

In one embodiment step c) comprises adding said defined amount of further ethylene oxide over a defined period of time, followed by a period of not adding any further ethylene oxide.

Preferably, step c) comprises adding a defined amount of further ethylene oxide to said reaction mixture at least twice, preferably over a defined period of time, whilst said polymerization reaction is in progress, each addition being followed by a period of not adding any further ethylene oxide to said reaction mixture.

Preferably, step c) comprises adding a defined amount of ethylene oxide to said reaction mixture in repeated intervals, whilst said polymerization reaction is in progress, each addition being followed by a period of not adding any further ethylene oxide to said reaction mixture.

In one embodiment said method comprises the additional step:

d) adding a defined amount of additional said at least one other alkylene oxide, at least once.

In one embodiment said polymerization reaction is performed at ambient pressure and a temperature $\leq 50°$ C., wherein, preferably, said ambient pressure is a pressure in the range of from $10^4$ Pa to $10^6$ Pa.

In one embodiment said polymerization reaction is performed in the presence of a catalyst, preferably a catalyst containing calcium.

Preferably, said at least one other alkylene oxide is selected from the group comprising propylene oxide, styrene oxide, 2-(2-methoxyethoxy)ethyl glycidyl ether (MEEGE) and butylene oxide.

In one embodiment said reaction mixture comprises ethylene oxide and two other alkylene oxides, wherein, preferably, each of said two other alkylene oxides are independently selected from the aforementioned group. This will result in a ter-polymer.

In one embodiment each of said repeated intervals comprises a period of adding a defined amount of ethylene oxide to said reaction mixture, each addition being followed by a period of not adding any further ethylene oxide to said reaction mixture.

Preferably, the molar ratio of ethylene oxide to said at least one other alkylene oxide is kept in the range of from 100 to 1.01, preferably from 6.67 to 1.34, in said copolymer.

The objects of the present invention are also solved by poly(ethylene oxide-co-alkylene oxide) copolymer produced by the method according the present invention.

Preferably, the poly(ethylene oxide-co-alkylene oxide) copolymer according to the present invention has a molecular weight of $10^4$-$10^7$, preferably $10^5$-$10^7$, and more preferably $10^5$-$10^6$.

In one embodiment, the poly(ethylene oxide-co-alkylene oxide) copolymer according to the present invention has a crystallinity <85%, preferably <64%, more preferably <45%, even more preferably $\leq 26\%$, and most preferably in the range of from 1% to 26%.

In one embodiment the poly(ethylene oxide-co-alkylene oxide) copolymer according to the present invention has an alkyleneoxide comonomer content in the range of from 1-99 mol %, preferably 15-75 mol. %.

In one embodiment the poly(ethylene oxide-co-alkylene oxide) copolymer according to the present invention has a multiblock tapered structure as defined below.

The objects of the present invention are also solved by an electronic device, preferably a battery or solar cell, comprising the poly(ethylene oxide-co-alkylene oxide) copolymer according to the present invention.

The objects of the present invention are also solved by the use of the poly(ethylene oxide-co-alkylene oxide) copolymer according to the present invention in an electronic device, preferably a battery or a solar cell.

In this application, reference is made at various places to "a defined amount of ethylene oxide" and to "addition over a defined period of time". By these terms, it is meant that the operator performing the respective reaction controls the amount of monomer (of e.g. ethylene oxide which is added) and determines the period of time (over which e.g. such ethylene oxide is added).

Sometimes, in this application, reference is made to "adding a defined amount of ethylene oxide to said reaction mixture in repeated intervals" which is meant to signify that a certain amount of ethylene oxide is added to the reaction mixture over a defined period of time which is then followed by a period where no further ethylene oxide is added, which again, is followed by a further period wherein ethylene oxide is again added, followed by a further period wherein no ethylene oxide is added etc, in other words ethylene oxide is added in defined portion in defined intervals. In the simplest case "such repeated intervals" may comprise only one period of addition followed by one period of no addition, but may also comprise two, three, four or more periods of addition of ethylene oxide, each period of addition being respectively followed by a period of no addition.

In this application, sometimes reference is made to the "crystallinity" of a polymer. This term, as used herein is meant to refer to the extent to which the respective polymer forms crystalline structures. If, for example, a polymer batch/sample is referred to as having a crystallinity (degree of crystallinity) of 10% (mass or volume fraction), this is meant to signify that 10% (mass or volume fraction) of the polymer batch/sample is crystalline. The crystallinity in this application was determined by DSC.

Generally speaking, "crystallinity" refers to the presence of translational three-dimensional order on the level of atomic dimensions. Crystallinity may be detected by various techniques. For the purposes of the present application, usually crystallinity is defined by differential scanning calorimetry (DSC). The degree of crystallinity is the fractional amount of crystalline phase in the polymer sample. In this context reference is made to the IUPAC-nomenclature of May 18, 2001, chapter 4 "definitions of terms relating to crystalline polymers", the content of which is incorporated herein in its entirety by reference thereto. In accordance therewith, the degree of crystallinity, $w_{c,h}$ (as defined by DSC) is given by the expression $$w_{c,h} = \Delta H_{fus}/\Delta H_{fus,c}$$

where $H_{fus}$ is the specific enthalpy of fusion of the sample and $H_{fus,c}$ is the specific enthalpy of fusion of the completely crystalline polymer over the same temperature range. The value of $H_{fus,c}$ may be obtained by extrapolating $H_{fus}$ to the density of the completely crystalline polymer, which in turn may be obtained from x-ray-diffractions data. The specific enthalpies of fusion are temperature dependent.

As used herein, the term "ambient pressure" refers to a pressure of approximately $10^5$ Pascals. In accordance with IUPAC recommendation, the standard conditions for gasses are 273.15 K (° C.) and a pressure of $10^5$ Pascals. IUPAC recommends that the former use of the pressure of 1 atm as standard pressure (equivalent to $1.01325 \times 10^5$ Pa) should be discontinued, which is also the approach taken for the purposes of the present application.

As used herein, the term "comonomer", generally refers to a monomer that is polymerized along with one or more other monomers to make a copolymer. The different comonomers used in a copolymerization are incorporated into each chain.

As used herein, the term "alkylene oxide" is used synonymously with "α-epoxide"

The term "multiblock tapered structure of a polymer", as used herein, is preferably meant to signify a structure described as follows:

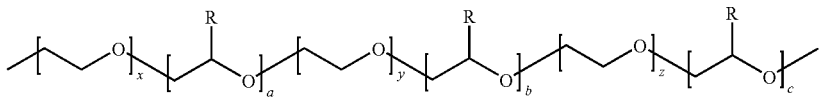

where $x > y > z$, $a < b < c$ and $x >> a$ and R is an alkyl or aryl group.

The present inventors have surprisingly found that using an interrupted mode of addition of ethylene oxide during the polymerization reaction allows a better control over the introduction of the co-monomer into the growing polymer chain. Ethylene oxide is added to the reaction mixture in intervals which are strictly controlled, and wherein the interim period after one addition, and before the next addition (if such next addition occurs) is also controlled. In a typical example of such copolymerization ethylene oxide may be bubbled through the reaction mixture at strictly controlled intervals of time (feeding cycles) at a certain temperature depending on the reactivity of the comonomer. Without whishing to be bound, the present inventors believe that at the beginning of the reaction and/or when further ethylene oxide is added, ethylene oxide monomer is preferentially incorporated into the growing polymer chain due to its higher reactivity in comparison to the other alkylene oxide comonomer. At the end of the interval, when ethylene oxide has been already consumed, the second monomer will be incorporated into the chain. The yield of the copolymer, its molecular weight and composition depend on the reactivity of the comonomer, the duration of each feeding cycle and the temperature. By controlling the polymerization process one can produce copolymers with a crystallinity as low as 1%. It is clear to someone skilled in the art that in the anionic polymerization of 1,2-epoxides the reactivity of the monomers decreases with the increase in the bulkiness of the alkyl group, so for example: EO>PO>BO>SO etc, (EO=ethylene oxide, PO=propylene oxide, BO=butylene oxide, SO=styrene oxide)

Since EO is the more reactive monomer it is rapidly consumed at the start of every cycle. Prolonging the interval when the reaction mixture is not saturated with EO enables the incorporation of greater amounts of e.g. BO or PO during each cycle. This strategy for performing the copolymerization resulted in the preparation of block-like copolymers with different composition of each block.

The incorporation of the comonomer in an ordinary heterogeneous copolymerization reaction of ethylene oxide with another α-epoxide, such as propylene oxide, butylene oxide etc. depends on the reactivity of such alkylene oxide. Polyethylene oxide copolymers with higher comonomer content and lower crystallinity, respectively, are produced, when the process is performed at a higher temperature. However, temperatures above 50° C. are not preferred, since the polymer thus produced swells in the reaction medium, and the control over the process becomes difficult (decreased yield and low molecular weight).

As opposed to the prior art method of producing poly(ethylene oxide-co-alkylene oxide) copolymer, the method in accordance with the present invention which involves one or several addition cycles (feeding cycles) has the advantage of a better control over the incorporation of the comonomer into the polymer chain. As a result of the disruption of the regularity of the "pure" poly(ethylene oxide) chain through the incorporated comonomer, the ability of the polymer chain to crystallize is highly decreased. Pure PEO (poly(ethylene oxide)) has a crystallinity of 64% as measured by the present inventors using differential scanning calorimetry (DSC). Generally speaking, pure PEO, as a linear polymer can have a crystallinity up to 85% (see for example Kumar et al., 2001, J. Electrochemical Society, 148 (12) A1336-A1340). So, a "decreased" crystallinity as used herein refers to a crystallinity <85%, preferably <64%.

In the following, reference is made to the following example which is meant to illustrate, not to delimit the present invention.

EXAMPLES

Example 1

The polymerizations were carried out at ambient pressure All samples were prepared with a catalyst, containing 0.5 g of calcium.

A 0.5 l four necked flask fitted with mechanical stirrer, condenser, and inlet tube, was heated and purged with dry argon. Liquid ammonia (70 ml) was added and then 0.5 g of Ca. The resulting blue solution was treated with a mixture of propylene oxide and acetonitrile. The molar ratio of Ca to modifiers was 1:1 and the molar ratio of propylene oxide to acetonitrile was 3:2. Ammonia was stripped off and the residue was slurried with 25 ml of isooctane (but heptane can be used as well). The catalyst was aged for 2 hours at reflux. Then 75 ml of isooctane were added to the cooled catalyst suspension.

A certain amount of comonomer—BO (butylene oxide) or PO (propylene oxide) was added to the catalyst suspension in isooctane. At zero time EO (ethylene oxide) was bubbled through the reaction mixture under stirring. The consumption of the comonomer was monitored by GC (gas chromatography). At certain intervals additional amounts of the comonomer were added, e.g. in the case of butylene oxide (BO) because of its lower reactivity. At the end of the process the polymer precipitate was separated from the solution by filtration, washed and dried The copolymer composition was determined by $^1$H NMR from the peak areas of pendent methyl protons ($\delta$=0.92 ppm) and those of protons at $\delta$=4-3.5 ppm.

The characteristics of the copolymers obtained and their thermal properties are summarized in Table 1 and 2.

TABLE 1

P(PO-co-EO) (=Poly (ethylene oxide-co-propylene oxide)copolymer). Copolymerization of EO with PO (propylene oxide); EO (ethylene oxide) was bubbled for 5 min at regular intervals. Catalyst containing 0.5 g of Ca.

| P(PO-co-EO) no. | Copolymerization | | | | | Fraction insoluble in Hexane | | | |
|---|---|---|---|---|---|---|---|---|---|
| | T, °C. | PO (g) | Feeding cycle min/min$^a$ | Yield g/h | Molecular Weight | Comonomer mol % | wt % | $[\eta]^b$, dl/g | $\chi^c$ % crystallinity |
| 1 | 50 | 25 | 5/25 | 32.5/4 | — | 35.6 | 42.0 | 4.12 | 14 |
| 2 | 50 | 25 | 5/25 | 34.2/4 | — | 32.0 | 38 | 6.63 | 13 |
| 3 | 50 | 30 | 5/25 | 17/1 | — | 68.4 | 79 | 6.65 | 2 |
| 4 | 50 | 25 | 5/15 | 48.3/4 | — | 23.0 | 28.6 | 3.13 | 21 |
| 5 | 50 | 30 | 5/15 | 19.5/40 min | — | 62.8 | 69 | 7.16 | 1 |
| 6 | 50 | 25 | 5/35 | 31.5/3 | $4 \times 10^5$ | 44.4 | 51.4 | 10.1 | 8 |
| 7 | 50 | 30 | 5/35 | 20/1.5 | — | 65.5 | 71.5 | 7.25 | 7 |
| 8 | 40 | 20 | 5/25 | 37/4 | $3.7 \times 10^5$ | 17.4 | 21.8 | 2.4 | 22 |
| 9 | 40 | 25 | 5/25 | 30/4 | — | 28.6 | 34.6 | 8.82 | 9 |
| 10 | 40 | 30 | 5/25 | 36/4 | — | 32.1 | 38.4 | 4.75 | 11 |
| 11 | 40 | 25 | 5/15 | 39/4 | — | 17.7 | 22.3 | 1.71 | 18 |
| 12 | 40 | 30 | 5/15 | 48/3 | — | 27.1 | 32.9 | 5.03 | 12 |
| 13 | 40 | 20 | 5/15 | 50/4 | — | 15.8 | 19.9 | 2.07 | 20 |

Generally, in the above table, the molecular weight, if not explicitly indicated was in the range of $10^5$-$10^6$.

TABLE 2

P(BO-co-EO) (=Poly(ethylene oxide-co-butylene oxide) copolymer.

| P(BO-co-EO) no. | Copolymerization | | | | | | Fraction insoluble in hexane | | | |
|---|---|---|---|---|---|---|---|---|---|---|
| | T, °C. | Hours from the start | BO (g) | Feeding cycle$^a$ min/min | Molecular Weight | Yield g/h | Yield of fr., wt % | Comonomer mol % | wt. % | $[\eta]^b$, dl/g | $\chi^c$ % |
| 1 | 50 | 0 | 25 | 5/25 | $9.3 \times 10^5$ | 15/2 | 80 | 26.3 | 38.8 | 3.58 | 24 |
| 2 | 50 | 0 | 25 | 5/25 | $9.7 \times 10^5$ | 30/4 | 95 | 19.0 | 28.0 | 3.76 | 26 |
| 3 | 60 | 0 | 25 | 5/25 | $1.2 \times 10^6$ | 26/4 | 85 | 26.3 | 38.7 | 4.68 | 15 |
| 4 | 50 | 02 | 256 | 5/25 | $2.8 \times 10^5$ | 14/5 | — | 17.0 | 25.1 | 0.98 | 23 |
| 5 | 50 | 02 | 256 | 5/25 | $6.3 \times 10^5$ | 29/5 | 86 | 23.2 | 34.2 | 2.4 | 18 |
| 6 | 50 | 02 | 256 | 5/55 | $1.3 \times 10^6$ | 14/4 | 44 | 31.1 | 45.8 | 5.13 | 16 |

TABLE 2-continued

P(BO-co-EO) (=Poly(ethylene oxide-co-butylene oxide) copolymer.

| | Copolymerization | | | | | Fraction insoluble in hexane | | | | |
|---|---|---|---|---|---|---|---|---|---|---|
| P(BO-co-EO) | T, | Hours from | BO | Feeding cycle[a] | Molecular | Yield | Yield of fr., wt % | Comonomer | | $[\eta]^b$, | $\chi^c$ |
| no. | °C. | the start | (g) | min/min | Weight | g/h | | mol % | wt. % | dl/g | % |
| | | | | | (gel) | | | | | | |
| 7 | 50 | 02 | 256 | 5/55 | $6.7 \times 10^5$ | 17/5 | 88 | 26.9 | 39.7 | 2.56 | 18 |
| 8 | 50 | 0 | 30 | 5/25 | $1.1 \times 10^6$ | 27/4 | 93 | 28.5 | 42.0 | 4.45 | 12 |
| 9 | 50 | 0 | 25 | 5/40 | $1.2 \times 10^6$ | 31/4 | 88 | 23.8 | 35.1 | 4.91 | 13 |

Copolymerization of EO with BO; EO was bubbled for 5 min at regular intervals. Catalyst containing 0.5 g of Ca
[a]EO was bubbled through the reaction mixture for 5 min and then the polymerization proceeded without introduction of EO for certain time.
[b]intrinsic viscosity at 25° C. in toluene
[c]crystallinity of the PEO phase Table 1 and 2 show the results of a copolymerization of ethylene oxide respectively with propylene oxide and butylenes oxide. In table 1 and 2, the column "feeding cycle min/min" gives two numbers separated by a "/". The first number indicates the minutes for which EO is bubbled in the mixture, and the second number gives the remaining period during which EO is not bubbled in the mixture. The total reaction time can be taken from the next column "yield g/h", namely from the second number in that column which indicates the total reaction time. The first number in the "yield"-column indicates the yield of product expressed in gram. So, for example, for polymer 5 in table 1, EO was bubbled for 5 minutes to the reaction mixture, followed by a period of 15 minutes, followed by a further period of five minutes bubbling EO followed by a further period of 15 minutes to make up the total time of 40 min which is also indicated in the "yield"-column. The same logic applies for all other experiments/polymer numbers (no.).

The crystallinity varies over a wide range, in this case (table 1) from 1% to 22%, which is a very good performance if one compares with the 64% crystallinity of pure PEO.

Table 2 shows the results of a copolymerization of ethylene oxide with butylene oxide (EO with BO), the crystallinity achieved in some instances may be as low as 12% and generally between 12 and 26%.

From the foregoing tables it can furthermore be seen that suitable PEO-polymer can be achieved wherein the polymer chain has been interrupted by an appropriate comonomer thus decreasing the crystallinity to values of 1 to 26% keeping the molecular weight of the copolymer high, e.g. at around $10^5$ to $10^6$ Dalton. In other words tailor-made synthesis conditions allow to adjust the molecular weight, the % of comonomer and the crystallinity of the new copolymers. Such conditions may be used for producing a copolymer having a decreased crystallinity whilst maintaining a high molecular weight.

The polymers thus produced can be used e.g. as polymer gel e.g. in batteries, photovoltaic devices etc. and are particularly suitable for such purposes due to their decreased crystallinity. For example they may be used in polymer gel electrolyte of a solar cell.

The features of the present invention disclosed in the specification, the claims and/or in the accompanying drawings, may, both separately, and in any combination thereof, be material for realizing the invention in various forms thereof.

The invention claimed is:

1. A method of producing a poly(ethylene oxide-co-alkylene oxide) copolymer, comprising the steps:
   a) providing a reaction mixture comprising ethylene oxide and at least one other alkylene oxide,
   b) allowing said reaction mixture to undergo a polymerization reaction,
   c) adding a defined amount of further ethylene oxide as the only further added monomer to said reaction mixture at least twice, over a defined period of time, whilst said polymerization reaction is in progress, each addition being followed by a period of not adding any further ethylene oxide to said reaction mixture.

2. The method according to claim 1, wherein step c) comprises adding a defined amount of ethylene oxide to said reaction mixture in repeated intervals, whilst said polymerization reaction is in progress, each addition being followed by a period of not adding any further ethylene oxide to said reaction mixture.

3. The method according to claim 1, further comprising:
   d) adding a defined additional amount of said at least one other alkylene oxide at least once.

4. The method according to claim 1, wherein said polymerization reaction is performed at ambient pressure and a temperature ≦50° C.

5. The method according to claim 4, wherein said ambient pressure is a pressure in the range of from $10^4$ Pa-$10^6$ Pa.

6. The method according to claim 1, wherein said polymerization reaction is performed in the presence of a catalyst.

7. The method according to claim 1, wherein said at least one other alkylene oxide is at least one selected from the group consisting of propylene oxide, styrene oxide, 2-(2-methoxyethoxy)ethyl-glycidyl ether (MEEGE) and butylene oxide.

8. The method according to claim 2, wherein each of said repeated intervals comprises a period of adding a defined amount of ethylene oxide to said reaction mixture, each addition being followed by a period of not adding any further ethylene oxide to said reaction mixture.

9. The method according to claim 8, wherein the molar ratio of ethylene oxide to said at least one other alkylene oxide is kept in the range of from 100 to 1.01 in said copolymer.

10. The method according to claim 8, wherein the molar ratio of ethylene oxide to said at least one other alkylene oxide is kept in the range of from 6.67 to 1.34 in said copolymer.

11. The method according to claim 1, wherein the defined amount of the further ethylene oxide is added to the reaction mixture by bubbling the further ethylene oxide through the reaction mixture.

12. The method according to claim 1, wherein the defined period of time the defined amount of the further ethylene oxide is added to said reaction mixture is from ⅓ to ⅕ the period of time of not adding any further ethylene oxide to said reaction mixture.

13. The method according to claim 1, wherein the total amount of the other alkylene oxide remains the same during the polymerization.

14. A method of producing a poly(ethylene oxide-co-alkylene oxide) copolymer, comprising:
   a) mixing ethylene oxide and at least one other alkylene oxide to form a reaction mixture;
   b) polymerizing the ethylene oxide as the only further added monomer and the other alkylene oxide in the reaction mixture; and
   c) during the polymerizing, adding a first additional amount of ethylene oxide as the only further added monomer and a second additional amount of ethylene oxide to the reaction mixture, wherein the first additional amount of ethylene oxide and the second additional amount of ethylene oxide are added separately and each addition of additional ethylene is followed by a period during which no ethylene oxide is added to the reaction mixture.

\* \* \* \* \*